Figure 1:
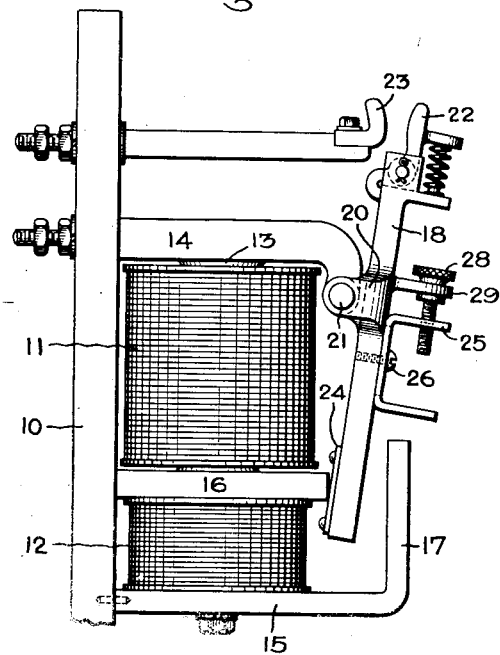

E. R. CARICHOFF.
CONTROL FOR ELECTRIC MOTORS.
APPLICATION FILED APR. 24, 1917.

1,311,754.

Patented July 29, 1919.
2 SHEETS—SHEET 1.

Inventor:
Eugene R. Carichoff,
by Albert G. Davis
His Attorney.

Inventor:
Eugene R. Carichoff,
His Attorney.

UNITED STATES PATENT OFFICE.

EUGENE R. CARICHOFF, OF SCHENECTADY, NEW YORK, ASSIGNOR TO GENERAL ELECTRIC COMPANY, A CORPORATION OF NEW YORK.

CONTROL FOR ELECTRIC MOTORS.

1,311,754.         Specification of Letters Patent.      Patented July 29, 1919.

Application filed April 24, 1917. Serial No. 164,269.

*To all whom it may concern:*

Be it known that I, EUGENE R. CARICHOFF, a citizen of the United States, residing at Schenectady, in the county of Schenectady, State of New York, have invented certain new and useful Improvements in Controls for Electric Motors, of which the following is a specification.

My invention relates to means for controlling electric circuits and has particular reference to the control of circuits of electric motors, so that they can be started, stopped and generally controlled in a reliable and efficient manner.

My invention relates more specifically to electro-magnetic switches for starting electric motors which are to operate automatically when a predetermined condition in a motor circuit is reached. My invention is particularly applicable to the starting of electric motors on what is commonly known as the counter-electromotive-force system. Such systems are very well known and have been used to a certain extent but a more general use has been prevented by reason of certain serious defects inherent in a system of this character. The main defect arises from the fact that since the actuating winding of the switch depends upon the counter electromotive force of the motor, the closing of the switch is seriously affected by variations in line voltage as well as by the heating of the actuating coil. This difficulty has long been recognized and understood by those skilled in the art and requires no further explanation.

In my previous Patent No. 867,476, dated October 1, 1907, I have disclosed a system, the object of which is to overcome these difficulties. The particular arrangement disclosed in the said patent involves the use of an electromagnetic switch or switches in which the operating coil is energized by the counter-electromotive force of the motor and a winding connected across a supply circuit is employed to oppose the force set up by the electromotive force winding. The energization of the opposing winding, of course, varies with the supply voltage and acts to compensate for the variations by causing the switch to close at a lower counter-electromotive force when the line voltage is low and at a higher counter-electromotive force when the line voltage is high. When the voltage is high the force opposing the closing force is high, and therefore, the counter-electromotive force would have to be higher before the switch would close. Likewise when the voltage is low the force opposing the closing force is low, and consequently, the switch would close at a lower counter-electromotive force.

One of the objects of my invention is to improve the switch in certain respects so as to make the compensation for variations of voltage and also for the heating of the coils more accurate. The general arrangements and construction of the switch has been modified and improved, both as to the arrangement of the coils and the action of the magnetic forces upon the switch member.

Other objects and purposes of my invention will appear in the course of the following specification in which I have shown my invention embodied in concrete form.

Figure 2:
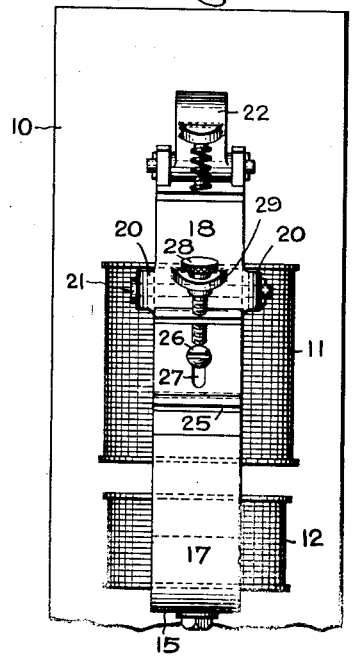
Figure 3:
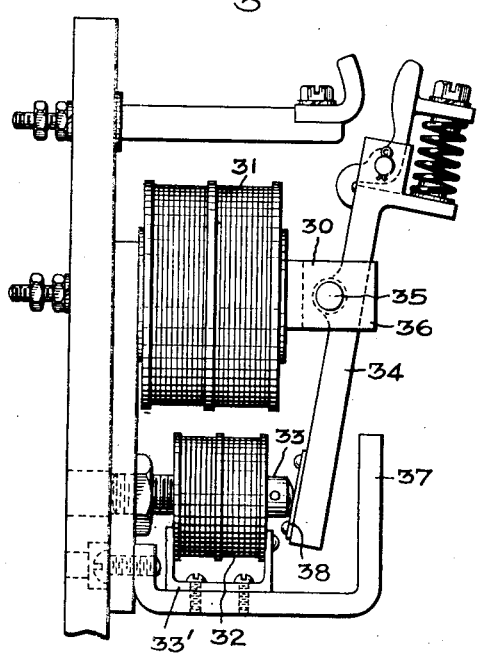
Figure 4:
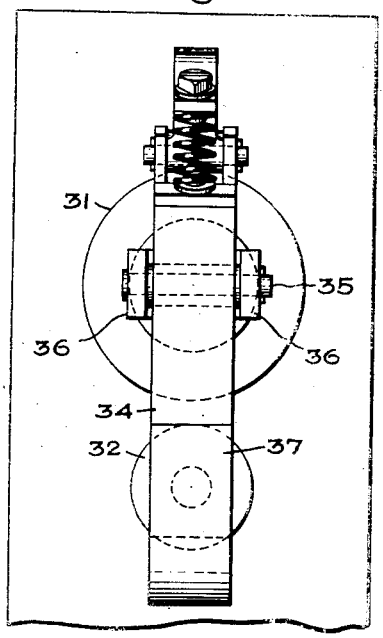
Figure 5:
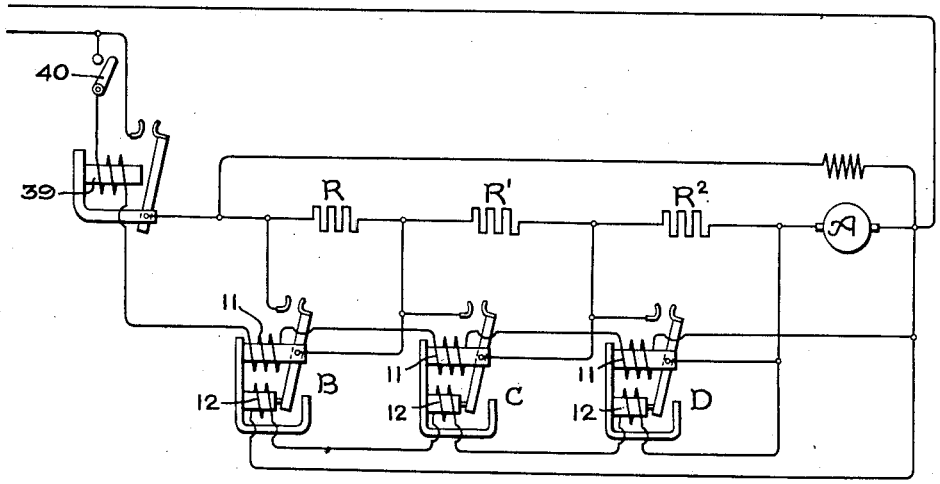
Figure 6:
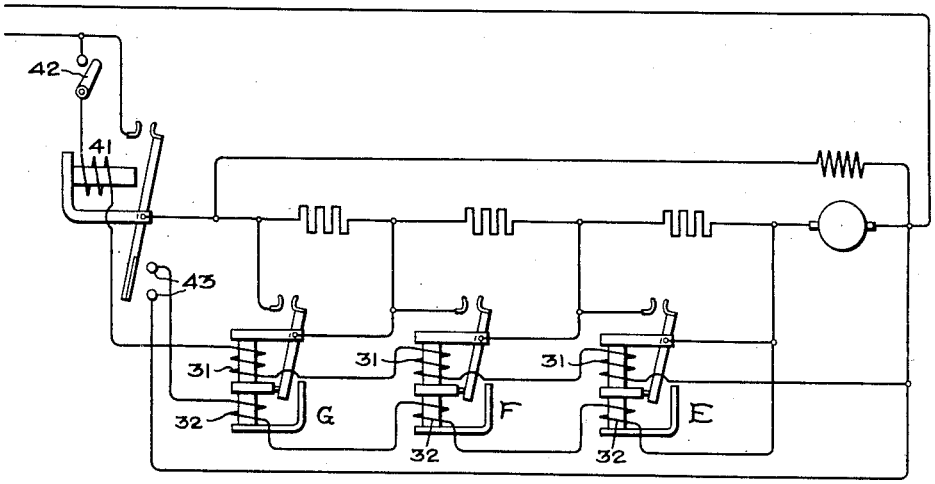

In the accompanying drawings illustrating my invention Figures 1 and 2 show a side and end view respectively of a switch embodying my invention; Figs. 3 and 4 are similar views of a switch embodying my invention in somewhat modified form; Fig. 5 is a diagram showing suitable circuit connections for the form of switch shown in Figs. 3 and 4 and Fig. 6 is a diagram showing suitable connections for the switch shown in Figs. 1 and 2.

Referring first to Figs. 1 and 2, it will be seen that the switch parts are mounted upon a base 10 of suitable insulating material. Two windings are provided, 11 and 12, the former being intended for connection to a circuit the voltage of which may vary to a certain extent above and below a normal value, while winding 12 is intended for connection to a circuit the potential of which is gradually increased to a maximum. I have illustrated this switch as one of the type commonly employed for starting electric motors and when so employed the winding 11 will be connected to the supply circuit and the winding 12 will be connected across the motor armature so as to be energized by the counter electromotive force thereof. The magnetic structure of this switch comprises a core 13 which extends continuously through both coils 11 and 12, terminating at its upper end in the magnetic member 14 and at the lower end in the magnetic member 15. Between the two coils is a pole piece 16 which acts as a holding out pole piece for the switch arm. The magnetic member 15 is bent upward at right angles as shown to form a pole piece 17 spaced from the pole piece 16 as shown so that the lower end of the switch arm may move between the two pole pieces. The switch arm 18 is pivoted to the member 14 by means of ears 20 which receive the pins or trunnions 21 which act as a pivot for the switch arm. The upper end of the switch arm is provided with a spring pressed contact 22 coöperating with stationary contact 23 so that the contacts wipe upon each other in a well understood manner. The lower end of the switch member extends into the space between the pole pieces 16 and 17 and the switch arm is so balanced that it normally assumes the position shown in the drawing with the lower end of the switch arm against the pole piece 16. A plate of non-magnetic material 24 is preferably interposed between the switch arm and the pole piece 16 to facilitate adjustment. In order to adjust the switch arm, I provide a U-shaped member 25 of magnetic material attached to the switch member so as to be adjusted toward and from the end of the pole piece 17. This is accomplished by means of a screw 26 passing through a slot 27, so that the member 25 may be moved longitudinally of the switch arm and a screw 28 mounted in a bracket 29 and threaded into the member 25 is provided to move the member 25 up or down on the switch arm.

As thus constructed and arranged, the operation of my switch is as follows: Assuming that the switch is used for starting a motor the winding 11 will be connected to a supply circuit and the winding 12 will be connected across the armature of the motor so that as the motor speeds up, it will have impressed upon it the gradually increasing counter-electromotive force of the motor. If now, the circuits of these two windings are closed the switch member will remain in its normal position as shown in Fig. 1, since it is held in this position by the pull at the pole piece 16 due to the energization of the winding 11. Assuming for purposes of illustration that the direction of the flux generated by the winding 11 is downward through the core 13, it will pass outward through the intermediate pole piece and upward through the switch member to the upper member 14. There will also be a certain amount of leakage flux across the gap between the pole piece 17 and the lower end of the switch member 16 will not cause any movement of the switch member, since the magnetic circuit is substantially closed through the main branch just traced. The direction of the flux due to the winding 12 will also be downward through the core 13, upward through the pole piece 17 and across through the switch member to the pole face 16, there being also a certain amount of leakage flux upward through the switch member which is ineffective at this time. It will be noted that while the flux due to the two windings is in the same direction through the core 13 and through the pole face 17, they oppose each other in the pole piece 16. When, therefore, the counter-electromotive force reaches a proper value the flux in the pole piece 16, due to the winding 11, will be neutralized by the flux due to the winding 12, whereas the flux due to the two windings will be added in the path through the pole piece 17 and into the switch member, since they are in the same direction. The net result will be that when the counter-electromotive force reaches a proper value, the holding-out force due to the winding 11 will be neutralized and the switch arm will be moved over into engagement with the pole face 17 to close the switch. The two windings will now both be acting to hold the switch member in closed position.

It should be noted that with this arrangement, if the line voltage varies above or below normal, the closing of the switch will be correspondingly affected. For instance, if the voltage should be below normal the flux due to the winding 11 will, of course, be less than normal, and a less flux due to the winding 12 will neutralize the holding-out effect and close the switch. In other words, when the voltage is lowered, the switch will close at a lower value of counter-electromotive force. Likewise, if the voltage is above normal the switch will close at the higher value of counter-electromotive force. This, of course, is what the conditions should be. By properly proportioning and arranging the parts, the action of the two coils may be caused to vary at different ratios; i. e., if there is a drop of voltage of 10 per cent., the switch may be caused to close at a corresponding decrease in the counter-electromotive force, or it may close upon a greater or less increase of counter-electromotive force as desired. It will also be noted that changes in temperature are likewise compensated for, since both coils being heated or cooled, they will offset each other to a large extent. In other words, the switch will close at substantially the same value of counter-electromotive force whether the winding 12 is cold or hot, since the winding 11 will be in a similar condition. By turning the screw 28 in one direction or the other the value of counter-electromotive force at which the switch closes may be varied. If the screw is turned so as to lower the adjustable member 25 a greater amount of flux will pass from the pole piece 17 into the member 25 thereby increasing the pull in a direction which opposes the closing of the switch. Therefore a greater current in the counter-electromotive force coil will be required to close the switch. Likewise, if the member 25 is raised, the opposite effect will be obtained.

Referring now to Fig. 3, it will be seen that the arrangement is somewhat different in detail. In this case the arrangement is such that after the switch closes, the counter-electromotive force coil has substantially no effect in holding the switch closed. In some respects this arrangement is preferable, since in order to open the switch, it is only necessary to open the circuit of the shunt coil, whereas in the arrangement shown in Figs. 1 and 2, it is necessary to open the circuit of both coils. However, this advantage is to a certain extent offset by the fact that the force which holds the switch closed is not so great, other things being equal, and is therefore not quite so efficient. The magnetic structure consists of an L-shaped piece of magnetic material 30 on one leg of which the line coil 31 is mounted. The counter-electromotive force coil 32 is mounted upon a separate core 33 which is secured to the L-shaped member as shown. The switch member 34 is pivoted at 35 in two ears 36 on the L-shaped member. A bent member of magnetic material 36 is secured to the base and extends below the coil 32 and then upward to form pole piece 37. The core 33 of the winding 32 extends beyond the coil and acts as a stop against which the switch member normally rests, there being also in this case a non-magnetic plate 38 for separating the two parts.

As thus constructed and arranged, it will be seen that when the circuits of the two windings 31 and 32 are closed the switch member will be held in its open position as the current in the winding 32 will be below the closing value. Assuming that the flux due to the winding 31 is through the core within the coil 11 from right to left then downward through the vertical portion of the L-shaped member out to the right through the core 33 and upward through the switch member, the switch member will be held in its normal position as pointed out in connection with Fig. 1. The coil 32 is so wound that the flux due to this winding will be from right to left through the core 33 and will hence oppose the flux due to the winding 31 through this path as described in connection with Fig. 1. As the counter-electromotive force builds up, the holding-out force gradually decreases until it finally becomes substantially zero or at least low enough to be overcome by the force acting at pole piece 37 tending to close the switch. When the switch finally closes it will be held closed by the flux due to the shunt coil, and the counter-electromotive force will have substantially no effect. The adjustment in this case is obtained by screwing the core 33 in or out while the coil is held stationary by the bracket 33'. As above pointed out, this arrangement has some slight advantages over that arrangement shown in Figs. 1 and 2, and also has some disadvantages, but in general it accomplishes the same result in substantially the same way; i. e., changes of the line voltage and the heating of coils are compensated for.

Referring now to Fig. 5, I have shown a diagram of connections suitable for the arrangement shown in Fig. 3. Referring to this figure, 39 is an electromagnetic line switch which closes the circuit through the resistances R, R' R² and the motor armature A, and this electromagnetic switch is controlled by the manually operated switch 40. B, C and D indicate three switches of the type shown in Figs. 3 and 4 for cutting out the resistance sections R, R' and R² respectively. The line coils 11 of these switches are in series with the winding of the electromagnetic switch 39, so that upon closing the switch 40, these windings are all energized and the motor circuit is closed. The counter-electromotive force coils 12 are connected across the motor armature as shown. The contactors B, C and D are adjusted so as to operate when the counter-electromotive force reaches a proper value. For instance, the switch D will close when the counter-electromotive force is about 50% of the line voltage, the switch C when it is about 70%, and the switch B when it is about 87%. If the line voltage should drop, say 10%, the switches B, C and D will close at say, for instance, 10% less counter-electromotive force, although this percentage may be varied if desired as above described. If the voltage should be 10% above normal the switches would close at a correspondingly high counter-electromotive force. Likewise the switches will operate at substantially the same counter-electromotive force hot or cold, as above described.

In Fig. 6 I have shown a diagram of connections suitable for use with the form of switch shown in Figs. 1 and 2. The arrangement of the connections in this case differs from those in Fig. 5 only in that the circuit of the counter-electromotive force coils 32 are controlled by the electromagnetic switch 41 which in turn is controlled by the manually operated switch 42. This electromagnetic switch in addition to having main contacts for closing the motor circuit is provided with auxiliary contacts 43, for closing the circuit of the coil 32, which are closed when the switch closes. Therefore, when the switch 42 is opened, the motor circuit is opened as are also the coils 31 and 32 of the electromagnetic switches E, F and G. Otherwise the operation is identical with that described in Fig. 5.

It will be seen that I have provided an electromagnetic switch of improved design for starting motors on a counter-electromotive force system which always operates at a counter electromotive force which is proper for the particular condition of the line voltage at the time; i. e., above, below, or at normal voltage. Moreover it is obvious that changes in current in the counter-electromotive force coil due to the heating of the coil are compensated for so that the switch will operate at substantially the same counter-electromotive force whether the coil is cold or at its maximum operating temperature, and wipes home at full pressure. It will also be noted that there is always full power available for closing the switch and wiping it home, since this is done by the shunt coil (in some cases aided by the counter-electromotive force coil), instead of being done by the widely variable force of the counter-electromotive force coil as heretofore practised.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with an electric motor and a supply circuit therefor, of an electromagnetic switch for starting the motor comprising a switch member normally in open position, a winding energized from the supply circuit and a magnetic structure energized thereby to either hold the switch member in open position or hold it in closed position and a winding energized by the counter-electromotive force of the motor to decrease the holding out force and cause the switch member to move to closed position.

2. The combination with an electric motor and a supply circuit therefor, of an electromagnetic switch for starting the motor comprising a switch member normally in open position, a winding energized from the supply circuit and a magnetic structure energized thereby to set up two forces, one holding the switch member in open position and the other tending to move it to closed position, and a second winding energized by the counter-electromotive force of the motor to counteract the holding out force on the switch member and thereby cause the switch member to move to closed position.

3. The combination with an electric motor and a supply circuit therefor, of an electromagnetic switch for starting the motor comprising a switch member normally in open position, a shunt winding connected across the supply circuit, a winding energized by the counter-electromotive force of the motor and a magnetic structure for said winding so arranged that when the shunt winding is energized the switch member will be held in open position until the counter-electromotive force winding is energized to a proper value whereupon the switch member will be moved to closed position and held closed by the shunt coil.

4. The combination with an electric motor and a supply circuit therefor, of an electromagnetic switch for controlling the motor circuit comprising a switch member normally in open position and electromagnetic means for holding the switch member either in open or in closed position, said means including a winding energized from the supply circuit and a winding energized by the counter-electromotive force of the motor to oppose the flux of the other winding and cause the switch to close.

5. The combination with an electric motor and a supply circuit therefor, of an electromagnetic switch for controlling the motor circuit comprising a switch member normally in open position, a magnetic structure energized from the supply circuit to hold the switch member in open position and a winding energized by the counter-electromotive force of the motor to decrease the holding-out force as the motor speeds up.

6. The combination with an electric motor and a supply circuit therefor, of an electromagnetic switch for starting the motor comprising a switch member normally in open position, a winding energized from the supply circuit, a magnetic structure energized thereby to either hold the switch member in its open position or hold it in closed position, and a winding energized by the counter-electromotive force of the motor to decrease the holding-out force on the switch member and cause it to move to closed position when the counter-electromotive force is increased to a proper value.

7. The combination with an electric motor and a supply circuit therefor, of an electromagnetic switch for starting the same comprising a switch member normally in open position, a winding energized from the supply circuit, a magnetic structure energized by said winding to hold the switch member in closed position and a second winding acting on the switch member to cause it to close only when the counter-electromotive force of the motor reaches a maximum value which varies in accordance with the energy of the winding connected to the supply circuit.

In witness whereof I have hereunto set my hand this 23rd day of April, 1917.

EUGENE R. CARICHOFF.